US005842386A

United States Patent [19]

Hirota et al.

[11] Patent Number: 5,842,386

[45] Date of Patent: Dec. 1, 1998

[54] LOCKING DEVICE FOR TRANSFER FEEDER

[75] Inventors: Yuji Hirota; Toshihiro Tanaka; Nobuyuki Kaji, all of Ishikawa-ken, Japan

[73] Assignee: Kabushiki Kaisha Komatsu Seisakusho, Japan

[21] Appl. No.: 863,013

[22] Filed: May 23, 1997

Related U.S. Application Data

[63] Continuation-in-part of Ser. No. 537,028, Sep. 29, 1995, abandoned, which is a continuation of Ser. No. 949,255, Nov. 23, 1992, abandoned.

[51] Int. Cl.[6] .............................. B23B 29/24; G05G 5/06

[52] U.S. Cl. ............................ 74/813 L; 74/527; 74/526; 403/286

[58] Field of Search ......................... 74/526, 527, 813 L; 72/405.1, 421; 403/340, 286

[56] References Cited

U.S. PATENT DOCUMENTS

| | | | |
|---|---|---|---|
| 4,557,133 | 12/1985 | Mikusch et al. | 72/405 |
| 4,795,320 | 1/1989 | Tuckey | 403/286 |
| 4,887,926 | 12/1989 | Kunz | 403/286 X |
| 4,934,504 | 6/1990 | Torii et al. | 74/813 L |
| 4,979,855 | 12/1990 | Babel | 74/813 L |
| 5,007,762 | 4/1991 | Duran | 403/340 X |

FOREIGN PATENT DOCUMENTS

| | | |
|---|---|---|
| 0116684 | 8/1984 | Germany . |
| 54-49029 | 9/1982 | Japan . |
| 61-99530 | 5/1986 | Japan . |

OTHER PUBLICATIONS

Eiju Matsunaga "Transfer Press Working." Nikkan Kogyo Shinbunsha, Jun. 30, 1980.

*Primary Examiner*—Vinh T. Luong
*Attorney, Agent, or Firm*—Rader, Fishman & Grauer; Ronald P. Kananen

[57] ABSTRACT

There is provided a locking device for a transfer feeder which can certainly lock transfer bars at desired positions so that the transfer bars and their driving portions will never initiate motion unexpectedly. The locking device includes a plurality of engaging plates secured to a feed carrier and an equalizer bar provided in lifting/clamping mechanism and formed with a plurality of engaging holes respectively aligned in longitudinal direction with regular intervals, and a plurality of locking pins secured on a plurality of portions of a press main body in opposition to the engaging plates and movable in axial and lateral directions by means of driving devices for engagement with respective one of the engaging holes.

4 Claims, 5 Drawing Sheets

LOCKING DEVICE FOR TRANSFER FEEDER

CROSS-REFERENCE TO RELATED APPLICATIONS

This application is a continuation-in-part of application Ser. No. 08/537,028, filed Sep. 29, 1995, now abandoned, which is a continuation of application Ser. No. 07/949,255, filed Nov. 23, 1992, now abandoned, which is the U.S. national phase of PCT/JP90/00676 filed May 25, 1990.

FIELD OF THE INVENTION

The present invention relates to a locking device for a transfer feeder employed in a transfer press.

BACKGROUND OF THE INVENTION

A transfer feeder employed in the conventional transfer press is constructed to have a pair of transfer bars which are movable in two-dimensional or three-dimensional directions, and to clamp a work by means of a finger provided in opposition to these transfer bars for transporting the work.

On the other hand, the transfer bars are adapted to be driven in feeding direction, lifting direction and clamping direction by means of a cam driven to rotate by a driving force taken-off by a power take off of the transfer press. A clutch, a brake and so forth are provided in the power take off for controlling transmission and blocking of the driving power.

In the above-mentioned conventional transfer feeder, when maintenance or repairing of the driving section in the feeder, an engineer enters within the feeder to perform maintenance or repair by stopping motion of the feeder side by a brake in a press main body side when the clutch of the power take off is engaged and by stopping motion of the feeder by means of a brake of the power take off when the clutch of the power take off is released.

However, since the brake of the press main body and the brake of the power take off employ friction plates, it is possible to cause unexpected movement of the transfer bars so forth due to slip of the friction plates due to weight of the transfer bars or so forth. Therefore, in the prior art, it cannot ensure safety of maintenance and repair.

SUMMARY OF THE INVENTION

The present invention is to solve the above-mentioned problems, and it is an object of the present invention to provide a locking device for a transfer feeder which can certainly lock transfer bars at desired positions so that the transfer bars and their driving portions will never initiate motion unexpectedly.

In order to accomplish the above-mentioned object, there is provided, in accordance with the first aspect of the invention, a locking device for a transfer feeder of a transfer press, which transfer feeder includes a pair of transfer bars driven in two or three dimensional directions, which comprises engaging means provided in a drive mechanism of the transfer bar, locking means provided at a plurality of stationary portions of a press main body for engaging with the engaging means, and driving means for driving the locking means.

In order to accomplish the above-mentioned object, there is provided, in accordance with the second aspect of the invention, and in the locking device according to the above-mentioned first aspect of the invention, the engaging means comprises a plurality of engaging plates fixed on a feed carrier and equalizer bar provided in lift/clamping mechanism and having a plurality of engaging holes formed in alignment in the longitudinal direction with a regular interval, and the locking means comprises a plurality of locking pins provided at plurality of portions of the press main body respectively in opposition to the engaging plates and movable in axial and lateral directions by means of the driving means to engage with one of a plurality of the engaging holes.

In order to accomplish the above-mentioned object, there is provided, in accordance with the third aspect of the present invention, and in the locking device according to the above-mentioned second aspect of the invention, each of the engaging plates has dogs at predetermined positions corresponding to each engaging holes, and engagement and release of the locking pin relative to the engaging holes is controlled by detecting one of the dogs by means of a detector.

In order to accomplish the above-mentioned object, there is provided, in accordance with the fourth aspect of the invention, and in the locking device according to the above-mentioned first aspect of the invention, the engaging means comprises an engaging plate secured on the press main body in upright fashion and having a plurality of engaging holes formed in alignment in a feed direction of a feed carrier with a regular interval, an engaging portion having a plurality of recessed grooves formed in a clamping drive lever in alignment in the longitudinal direction thereof with a regular interval and an engaging portion having a plurality of recessed grooves formed in a lifting drive lever in alignment in the longitudinal direction thereof with a regular interval, and the locking means comprises a plurality of locking cylinders secured on the feed carrier and two portions of the press main body respectively in opposition to the engaging plate and two engaging portions to engage with respective one of engaging holes and recessed groove.

In order to accomplish the above-mentioned object, there is provided, in accordance with the fifth aspect of the invention, and in the locking device according to the above-mentioned fourth aspect of the invention, the locking cylinder is placed at locking position by a biasing means and at an unlocking position by a hydraulic pressure.

With the present invention having the above-mentioned respective features, since the locking device for mechanically locking the drive mechanisms for driving the transfer bars in feeding, lifting, and clamping directions, even when engineer performs maintenance or repair by entering into the transfer feeder, the transfer bars or its driving portions will never move unexpectedly due to their own weight or so forth to ensure safety in maintenance and repairing operations.

In addition, since it is constructed that the locking pin detecting the engaging hole in the engaging plate enters into the detected engaging hole, lock can be certainly established even when the transfer bars are stored at any desired position.

The above-mentioned and other objects, aspects and advantages of the present invention will become clear to those skilled in the art from the discussion described and illustrated in connection with the accompanying drawings which illustrate preferred embodiments meeting with the principle of the invention.

DESCRIPTION OF THE PREFERRED EMBODIMENTS

The preferred embodiments of the present invention will be discussed hereinafter in connection with the accompanied drawings.

At first, discussion will be given for the first embodiment of the present invention with reference to FIGS. 1 and 2.

Figure 1:
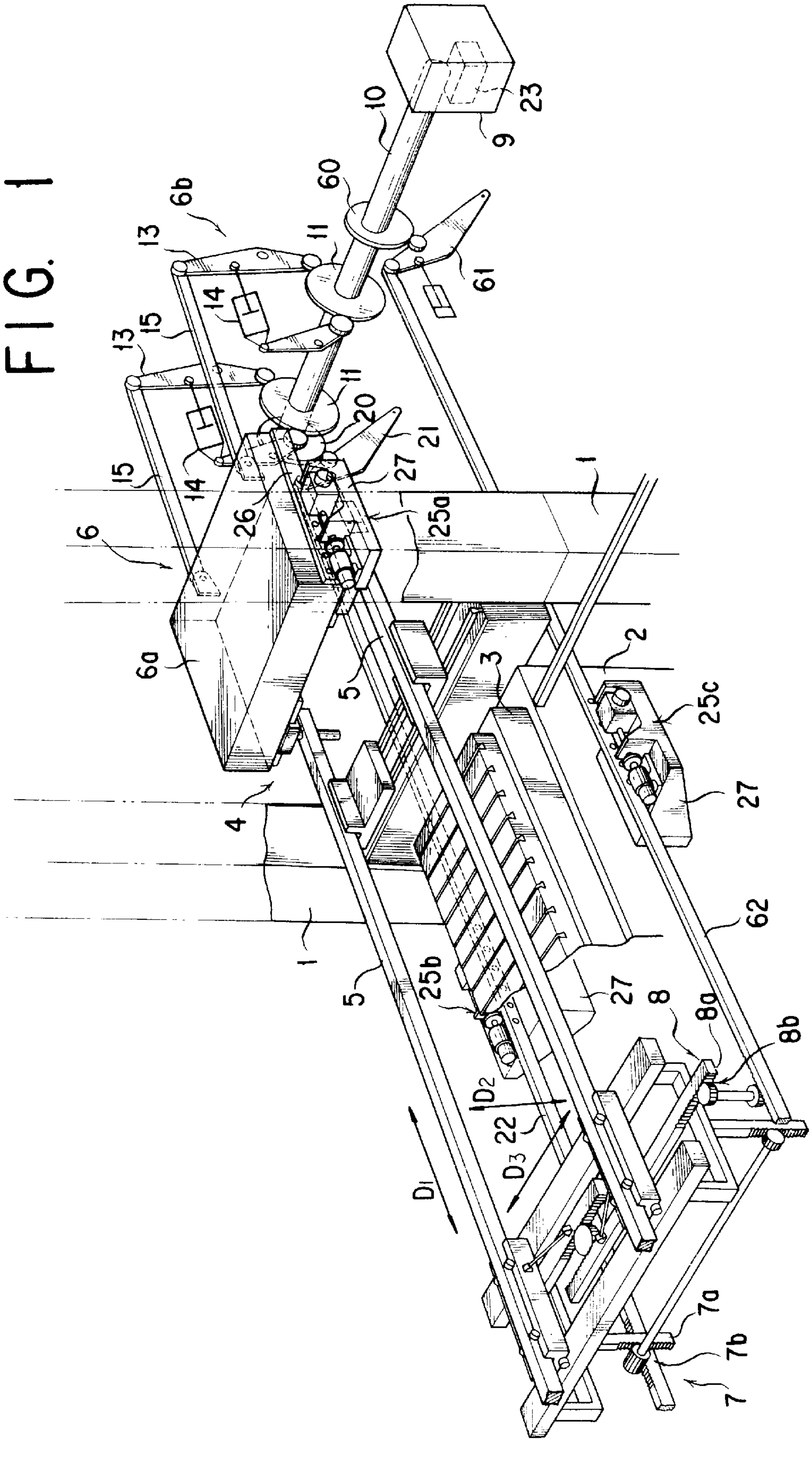
FIG. 1 is a perspective view of in the vicinity of a feed driving mechanism, in which the preferred embodiment of the present invention is employed.

In FIG. 1, the reference numeral 1 denotes a main body of a transfer press. The main body 1 of the transfer press includes a bed 2 which is always at a standstill and a moving bolster 3 which is movably mounted on the bed 2. The main body 1 also includes a transfer feeder 4 having a pair of transfer bars 5 which are provided above the moving bolster 2.

The transfer bars 5 are provided in parallel relationship orienting in parallel to the transfer direction of not shown works. The transfer bars 5 are adapted to be movable in three-dimensional directions of the feeding direction D1, the lifting direction D2 and the clamping direction D3.

The transfer feeder 4 has a feed drive unit 6 mechanically connected with the transfer bars 5 for driving the transfer bars 5 so as to move the transfer bars 5 along to the feeding direction D1, a lift drive unit 7 mechanically connected with the transfer bars 5 for driving the transfer bars 5 so as to move the transfer bars 5 along to the lifting direction D2 and a clamp drive unit 8 mechanically connected with the transfer bars 5 so as to move the transfer bars 5 along to the clamping direction D3. In addition, the transfer feeder 4 has a power take off unit 9 for providing a driving power to each of the feed drive unit 6, the lift drive unit 7 and the clamp drive unit 8 thereby driving the feed drive unit 6, the lift drive unit 7 and the clamp drive unit 8, respectively.

Namely, the transfer feeder 4 is adapted to move the transfer bars 5 along to the clamping direction D3 in that one of the transfer bars 5 approaches the other thereof by driving the clamp drive unit 8 according to the driving power from the power take off unit 9 so as to clamp a work and adapted to move the transfer bars 5 along to the feeding direction D1 and the lifting direction D2 by driving the feed drive unit 6 and the lift drive unit 7 according to the driving power therefrom whereby to transport the clamped work along to the feeding direction D1 and the lifting direction D2.

The feed drive unit 6 has a feed carrier 6*a* which is mechanically connected with the transfer bars 5 and a feed drive mechanism 6*b* which is mechanically connected to the feed carrier 6*a* so as to move the feed carrier 6*a* along to the feeding direction D1.

The feed drive mechanism 6*b* has a cam shaft 10 connected to the power take off unit 9 to be rotated by the driving power therefrom and has feeding cams 11, 11 are mounted on the cam shaft 10 so as to rotate therewith.

The feed drive mechanism 6*b* also has feed levers 13, 13, one end of which are contacted with the peripheral edges of the feeding cams 11, 11, respectively and has swing members 14, 14, one ends of which are contacted with the peripheral edges of the feeding cams 11, 11 and other ends of which are attached to the middle portions of the feed levers 13, 13, respectively. The swing members 14, 14 are adapted to swing the one ends of the feed levers 13, 13 about the other ends thereof in accordance with the rotation of the feeding cams 11, 11.

The one ends of the feed levers 13, 13 are connected with one ends of connection rods 15, 15, the other ends thereof being connected with the feed carrier 6*a*. That is, the swing of the one ends of the feed levers 13, 13 makes the feed carrier 6*a* move along to the feeding direction D1.

Moreover, a lifting cam 20 is mounted on the cam shaft 10 so as to rotate therewith. With the peripheral edge of the lifting cam 20, a middle portion of a lift lever 21 is contacted. One end of the lift lever 21 is pivotally supported with an axis member (not shown) and the other end thereof is connected with a lift equalizer bar 22. The other end of the clamp lever 21 is adapted to be swung about the one end thereof according to the rotation of the lifting cam 20 so as to move the lift equalizer bar 22 along to the feeding direction D1.

Moreover, a clamping cam 60 is mounted on the cam shaft 10 so as to rotate therewith. With the peripheral edge of the clamping cam 60, a middle portion of a clamp lever 61 is contacted. One end of the clamp lever 61 is pivotally supported with an axis member (not shown) and the other end thereof is connected with a clamp equalizer bar 62. The other end of the clamp lever 61 is adapted to be swung about the one end thereof according to the rotation of the clamping cam 60 so as to move the clamp equalizer bar 62 along to the feeding direction D1.

The lift drive unit 7 has a lift member 7*a* which is mechanically connected with the transfer bars 5 to and has a lift drive mechanism 7*b* mechanically connected with the lift member 7*a* and the lift equalizer bar 22. The lift drive mechanism 7*b* is adapted to produce a lift driving power by using the movement of the lift equalizer bar 22 whereby to move the lift member 7*a* along to the lifting direction D2 so that the transfer bars 5 moves along to the lifting direction D2 with the lift member 7*a*.

The clamp drive unit 8 has a clamp member 8*a* which is mechanically connected with the transfer bars 5 and has a clamp drive mechanism 8*b* mechanically connected with the clamp member 8*a* and the clamp equalizer bar 62. The clamp drive mechanism 8*b* is adapted to produce a clamp driving power by using the movement of the clamp equalizer bar 62 whereby to move the clamp member 8*a* along to the clamping direction D3 so that the transfer bars 5 moves along to the clamping direction D3 with the clamp member 8*a*.

In addition, the driving power take off unit 9 has a braking unit 23 for stopping the provision of the driving power to the feed drive unit 6, the lift drive unit 7 and the clamp drive unit 8.

On the other hand, locking devices 25*a*, 25*b* according to the present invention, are provided in the vicinity of the feed carrier 6*a* of the feed drive unit 6 and the equalizer bar 22, respectively.

Figure 2:
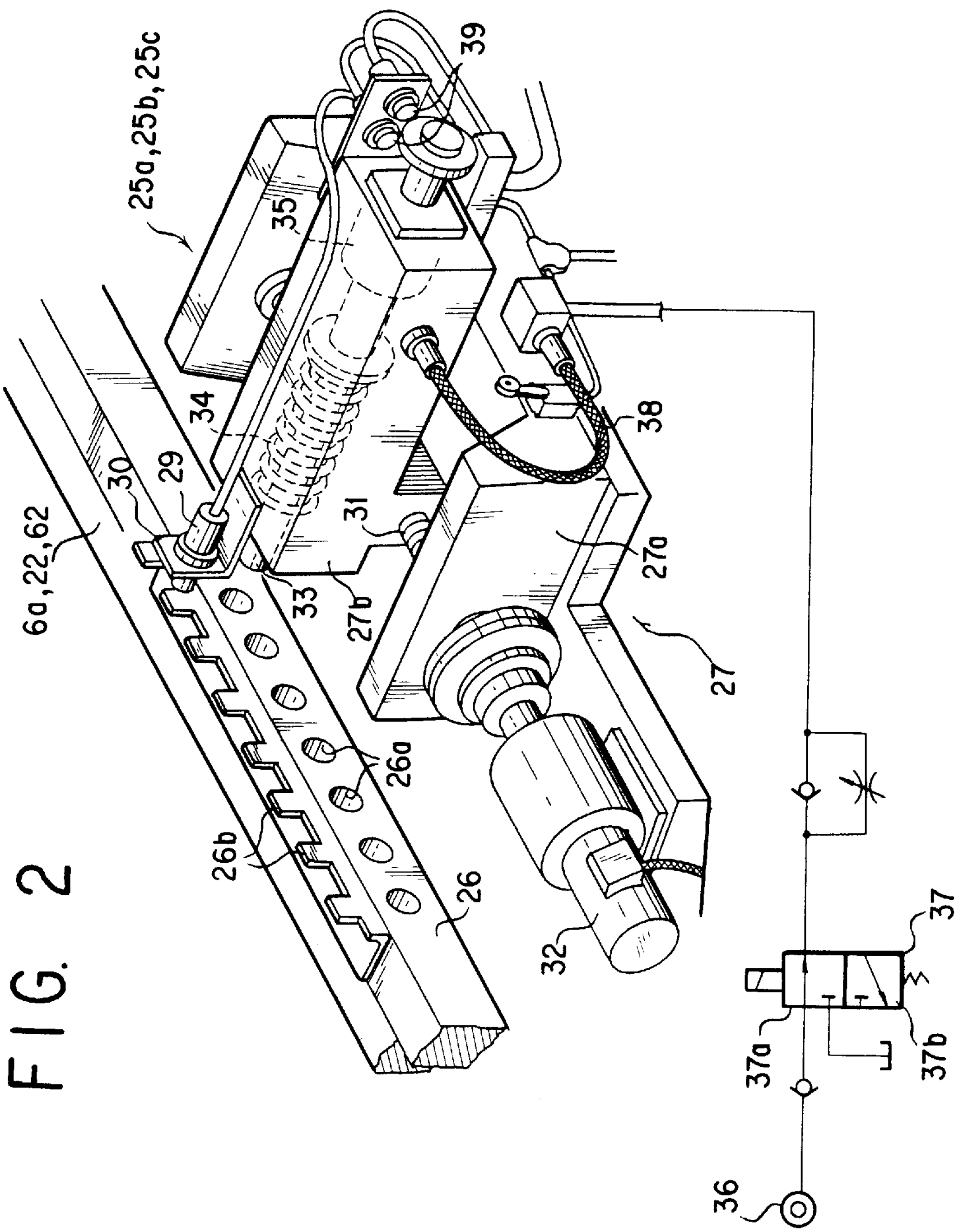
FIG. 2 is an enlarged perspective view of the preferred embodiment of the present invention.

As shown in FIGS. 1 and 2, each locking devices 25*a*, 25*b* and 25*c* has an engaging plate 26 fixedly secured on the feed carrier 6*a* and the equalizer bars 22 and 62, respectively and has a locking unit 27 for locking the feed carrier 6*a* and the equalizer bars 22 and 62, respectively. The locking unit 27 of the locking device 25*a* is fixedly secured on the inside wall of the upright 1. The each locking unit 27 of the locking devices 25*b* and 25*c* is fixedly secured on the bed 2. Moreover, especially in FIG. 2, the locking devices 25*b* and 25*c* provided in the vicinity of the equalizer bars 22 and 62, respectively, are shown.

The engaging plate 26 is formed with a plurality of engaging holes 26*a* aligned in the longitudinal direction corresponding to the feeding direction D1 with a regular interval and dogs 26*b* at the positions corresponding to the engaging holes 26*a*.

The locking unit 27 has a base 27*a* fixedly secured on the bed 2 and has a sliding member 27*b* movably supported on the base 27*a*. The locking device 27 also has a detector 29, such as a proximately switch, mounted on the sliding member 27*b* via a bracket 30. The detector is adapted to be moved with the sliding member 27*b* for detecting the dogs 26*b*.

A thread shaft 31 which is rotatably driven by a feeding motor 32 mounted on the base 27*a* is engaged with the lower portion of the sliding member 27*b* so that the sliding member 27*b* is driven to move along the engaging plate 26 by means of the feeding motor 32.

A locking pin 33 is provided at the sliding member 27*b* in that a tip end of the locking pin 33 is opposite to the engaging plate 26 so that the tip end thereof enters into one of the engaging holes 26*a* of the engaging plate 26 to lock the engaging plate 26.

The locking pin 33 is normally biased toward the engaging plate 26 by means of a compression spring 34 so as to establish locking for the engaging plate 26 by the effect of the compression spring 34. The rear end of the locking pin 33 is connected to a hydraulic cylinder 35 so as to unlock the engaging plate 26 in response to a hydraulic pressure supplied from a pressurized fluid source 36 via an electromagnetic valve 37 and a pipe 38.

Moreover, in the drawings, the reference numeral 39 denotes a detector for detecting locking and unlocking states of the locking pin 33.

Next, discussion will be given for operation. Upon maintenance or repair of the transfer feeder 4, the rotation of the cam shaft 10 of the feed drive unit 6 is stopped by the stop of providing the driving power to the cam shaft 10. As a result of that, the feed carrier 6*a* stops moving along to the feeding direction D1 and the equalizer bars 22 and 62 stop moving along to the feeding direction D1 thereby stopping the movement of the lift member 7*a* along to the lifting direction D2 and stopping the movement of the clamp member 8*a* along to the clamping direction D3. That is, the transfer bars 5 of the transfer feeder 4 stops moving.

When the transfer bars 5 thereof stops moving, each of the sliding member 27*b* of the locking unit 27 of the locking device 25*a*, 25*b* is driven by revolution of the feeding motor 32 to move along the engaging plate 26.

Since the detector 29 is mounted on the sliding member 27*b*, the detector 29 detects the dogs 26*b* of the engaging plates 26. In response to a signal from the detector 29, an electromagnetic valve 37 is switched from a communicating position 37*a* to a drain position 37*b* so that a work fluid in the hydraulic cylinder is drained.

By this, the locking pin 33 projects in the direction toward the engaging plate 26 by the action of the compression spring 34 and thus inserted into one of the engaging holes 26*a* at the corresponding position to the detected dog 26*b*. That is, the engaging plate 26 is mechanically locked to the locking unit 27.

Then, in this embodiment, since the locking unit 27 of the locking device 25*a* is fixedly secured on the pole portion 28 which is always at a standstill and the feed carrier 6*a* of the feed drive unit 6 is fixed to the engaging plate 26, the feed carrier 6*a* thereof is mechanically and fixedly locked to the pole portion 28.

Simultaneously, since the locking unit 27 of the locking device 25*b* is fixedly secured on the bed 2 which is always at a standstill and the equalizer bar 22 mechanically connected with the lift drive unit 7 and clamp drive unit 8 is fixed to the engaging plate 26, the equalizer bar 22 is mechanically and fixedly locked to the bed 2 whereby the lift member 7*a* and the clamp member 8*a* is mechanically and fixedly locked thereto.

Therefore, unexpected movement of the transfer bars 5 due to its own weight during maintenance or repairing operation can be certainly prevented.

Next, the second embodiment of the present invention will be discussed in connection with FIGS. 3 to 5.

Figure 3:
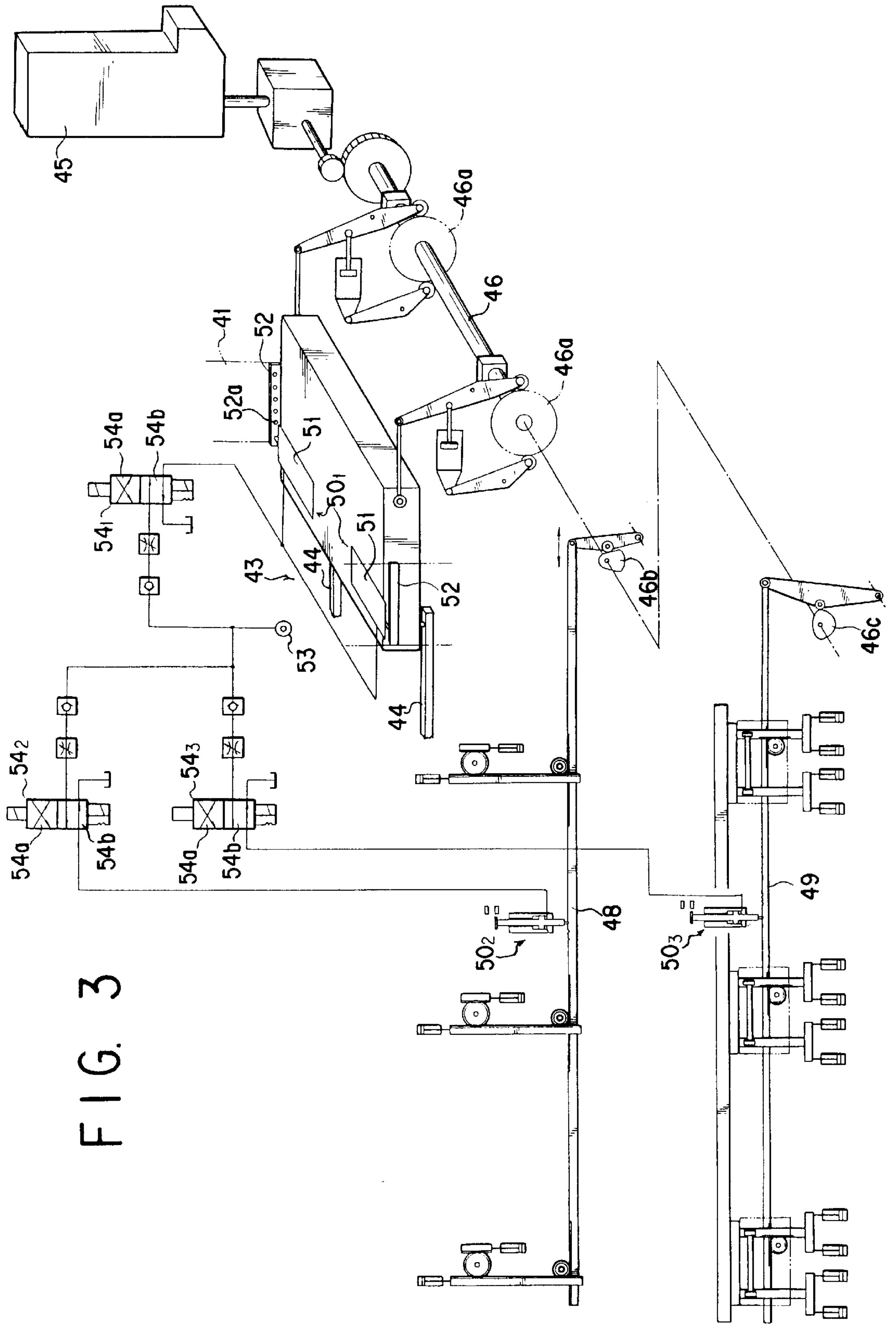
FIG. 3 is schematic illustration showing overall construction of a lock system of a transfer feeder employing another embodiment of the present invention.

As can be clear from FIG. 3, by a power take off 45 mounted thereon, a press main body 41 takes off the driving force for rotationally driving a cam shaft 46 by the taken off driving force.

A feeding cam 46*a*, a clamping cam 46*b* and a lifting cam 46*c* are provided on the cam shaft 46. A feed carrier 47 is driven by the feeding cam 46*a*. A clamping drive lever 48 is driven by the clamping cam 46*b*. A lifting drive lever 49 is driven by the lifting cam 46*c*. The transfer bars 44 are driven in a three- dimensional directions, i.e. feeding and returning direction, clamping and unclamping direction and lifting and lowering direction, by the feed carrier 47, the clamping drive lever 48 and the lifting drive lever 49.

Locking devices 501 , 502 , and 503 , according to the present invention, are respectively provided in the vicinity of the feed carrier 47, the clamping drive lever 48 and the lifting drive lever 49.

The locking devices 501 provided for the feed carrier 47 has locking cylinder 51 arranged at both sides of the feed carrier 47. A piston rod 51*a* projected from the locking cylinder 51 is adapted to insert the tip end portion thereof into an engaging hole 52*a* of an engaging plate 52 provided on the upright side 41*a* of the press main body 41 for locking the feed carrier.

Figure 4:
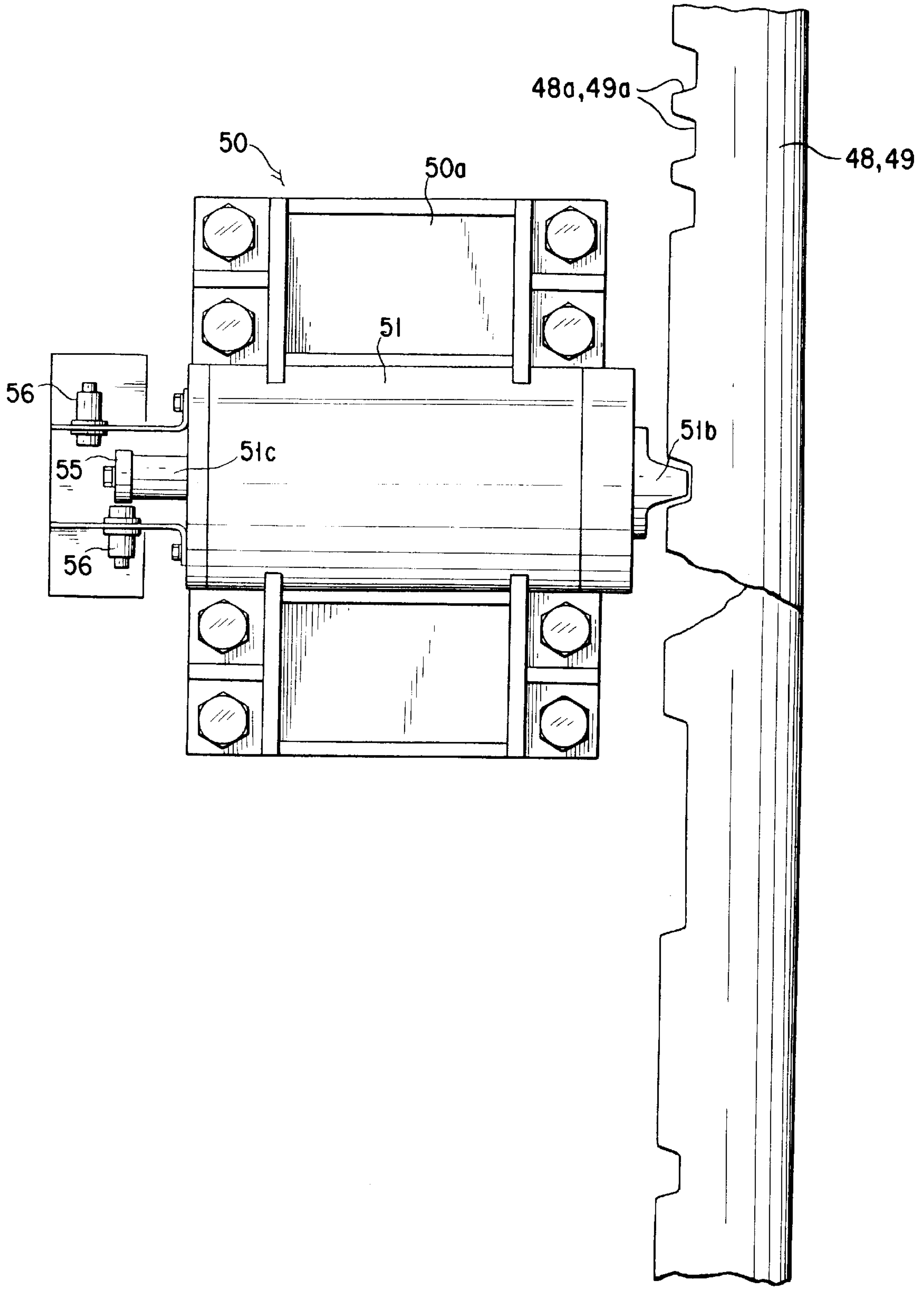
FIG. 4 is a schematic plan view of a locking cylinder employed in the embodiments of the present invention and elements in the vicinity thereof.
Figure 5:
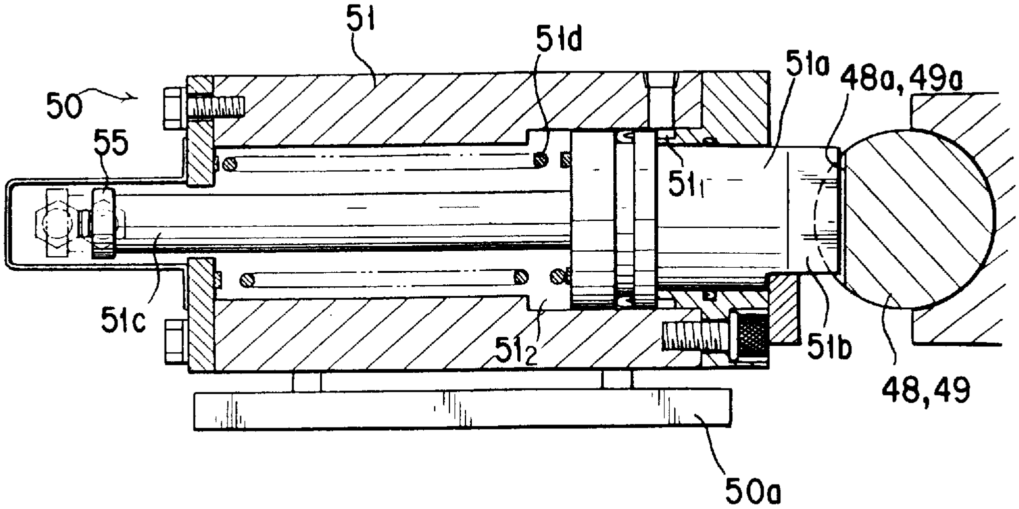
FIG. 5 is a section of the lock cylinder to be employed in the embodiment of the invention.

On the other hand, as shown in FIGS. 4 and 5, the locking devices 502 and 503 provided in the vicinity of the clamping drive lever 48 and the lifting drive lever 49 have locking cylinders 51 which are constructed to engage the tip ends of the piston rods 51*b* to a plurality of recess form engaging portions 48*a* and 49*a* respectively aligned in the longitudinal directions of the clamping drive lever 48 and the lifting drive lever 49.

The locking cylinder 51 are mounted on a stationary portion, such as a bed of the press main body 41 by means of brackets 50*a*. As shown in FIGS. 3 to 5, the interior space of the lock cylinder 51 is divided into a pressure chamber 511 and a spring chamber 512 by the piston 51*a*. A hydraulic pressure is supplied to the pressure chamber 511 from a pressurized fluid source 53 via an electromagnetic valve 54. On the other hand, a compression spring 51*d* for biasing the piston 51*a* in the locking direction is housed within the spring chamber 512.

An actuation rod 51*c* provided on the piston 51*a* to project toward the spring chamber 512 externally extends from the cylinder 51. A dog 55 is carried on the tip end of the actuation rod. A lock detector 56 comprising a proximity switch is adapted to detect the dog 55.

Next, operation of the foregoing embodiment will be discussed. Upon maintenance or repair of the transfer feeder 43, once the transfer feeder 43 is stopped, the hydraulic pressure supplied to respective of the pressure chambers 511 if the locking cylinder 51 are drained by switching respective electromagnetic valves 54 from communicating positions 54*a* to drain positions 54*b*. By this, the piston rods 51*b* maintained at the retracted position by the hydraulic pressure project toward the engaging plate 52, the clamping drive lever 48 and the lifting drive lever 49. As a result, tip ends of respective piston rods 51*b* enters into the engaging portions 52*a*, 48*a* and 49*a* to lock the feed carrier 47, the clamping drive lever 48 and the lifting drive lever 49.

Since the motion of the transfer bars 44 in the feeding and returning direction, the clamping and unclamping direction and lifting and lowering direction is restricted, unexpected motion of the transfer bars 44 due to their own weight can be certainly prevented.

What is claimed is:

1. A locking device for a transfer feeder of a transfer press, in which the transfer feeder comprises a pair of transfer bars adapted to be movable in a feeding direction, a lifting direction and a clamping direction, a feed drive means having a feed carrier mechanically connected to the transfer bars and a feed drive mechanism mechanically connected to the feed carrier for driving the feed carrier so as to move the transfer bars along the feeding direction, a lift/clamp drive means having a lift drive mechanism mechanically connected to the transfer bars, a clamp drive mechanism mechanically connected to the transfer bars and an equalizer bar mechanically connected to the feed drive mechanism, the lift drive mechanism and the clamp drive mechanism, said equalizer bar moving along the feeding direction in accordance with the drive of the feed drive mechanism and said lift drive mechanism and clamp drive mechanism being driven in accordance with the movement of the equalizer bar so as to move the transfer bars along to the lifting and clamping directions, a power take off means for providing driving power for the feed drive mechanism of the lift drive means, and a braking means for stopping providing driving power for the feed drive mechanism thereof so as to stop moving the transfer bars in the feeding direction, lifting direction and clamping direction, and in which the press main body is provided with a stationary structure which is always at a stand still, said locking device comprising:

engaging means fixedly mounted on at least one of the feed carrier and the equalizer bar;

locking means fixedly mounted on the stationary structure for engaging with the engaging means, said locking means cooperating with the engaging means for selectively establishing locking engagement at a plurality of preselected relative positions between the at least one of the feed carrier and the equalizer bar and the stationary structure;

driving means for driving the locking means for establishing locking at a selected relative position of at least one of the feed carrier and the equalizer bar and the stationary structure in response to the stop of the movement of the transfer bars and the equalizer bar by the braking means so as to fix at least one of the feed carrier and the equalizer bar at the stationary structure thereby preventing the transfer bars from moving unexpectedly.

2. A locking device as set forth in claim 1, wherein said driving means includes a detector which detects the engaging means being positioned to one of the preselected relative positions with respect to the locking means.

3. A locking device as set forth in claim 2, wherein said engaging means comprises an engaging plate fixed on at least one of the feed carrier and the equalizer bar, said engaging plate having a plurality of regularly spaced engaging holes aligned along the engaging plate, and wherein said locking means comprises a sliding member adapted to be movable along to the engaging plate by the driving means, a locking pin provided at the sliding member so as to be opposite to the engaging plate and a moving unit mechanically connected to the locking pin and operatively connected to the driving means for moving the locking pin so as to put the locking pin close to the engaging plate whereby to enter a tip end of the locking pin into one of the engaging holes of the engaging plate to lock the engaging plate.

4. A locking device as set forth in claim 3, wherein said engaging plate further includes a plurality of dogs arranged at predetermined positions corresponding to each of engaging holes, and wherein said detector is mounted on the sliding member so as to detect the dogs, said detector being operatively connected to the driving means whereby engagement and release of the locking pin relative to the engaging holes is controlled in response to one of the dogs to be detected by the detector.

* * * * *